No. 733,976.

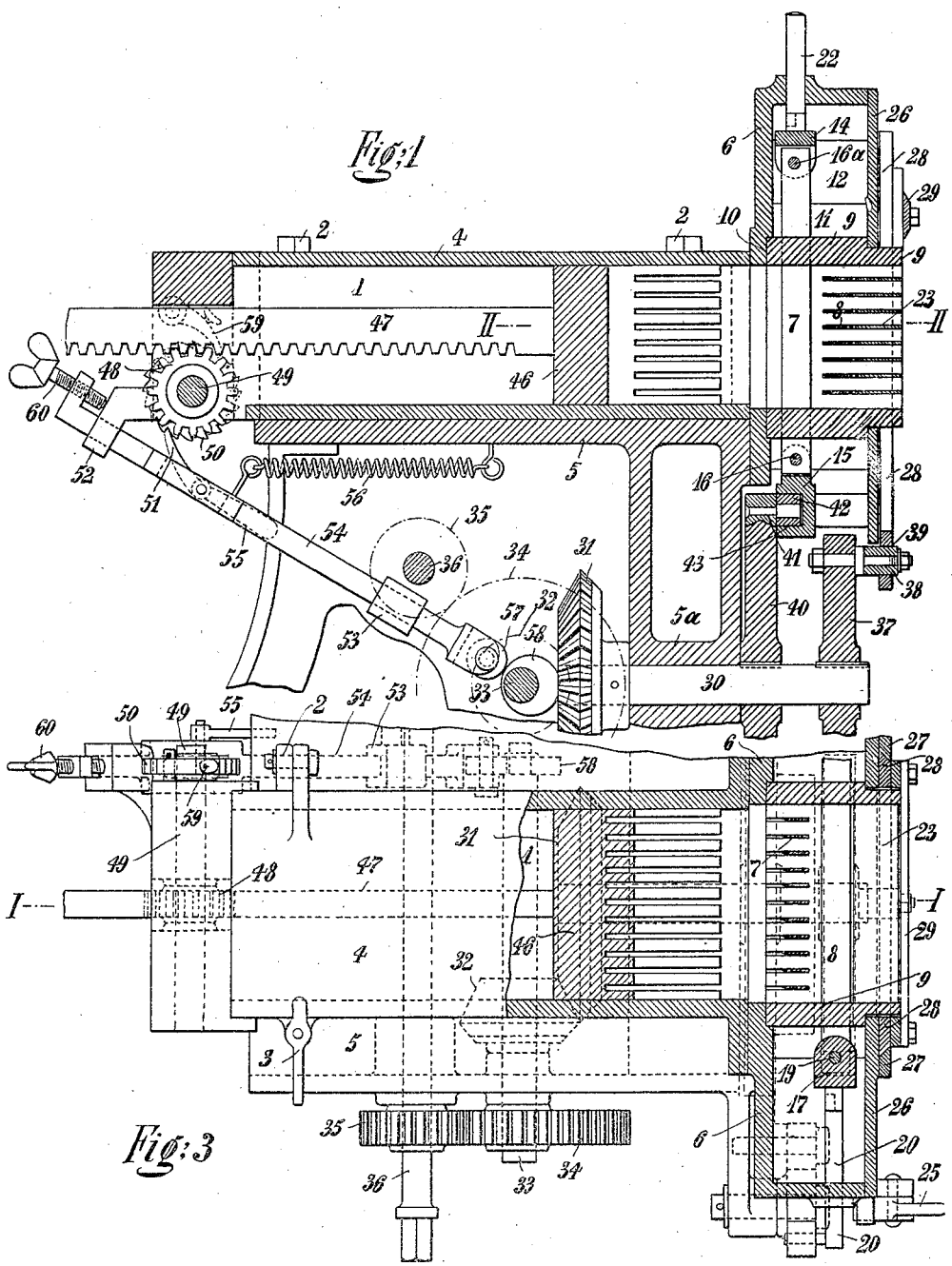

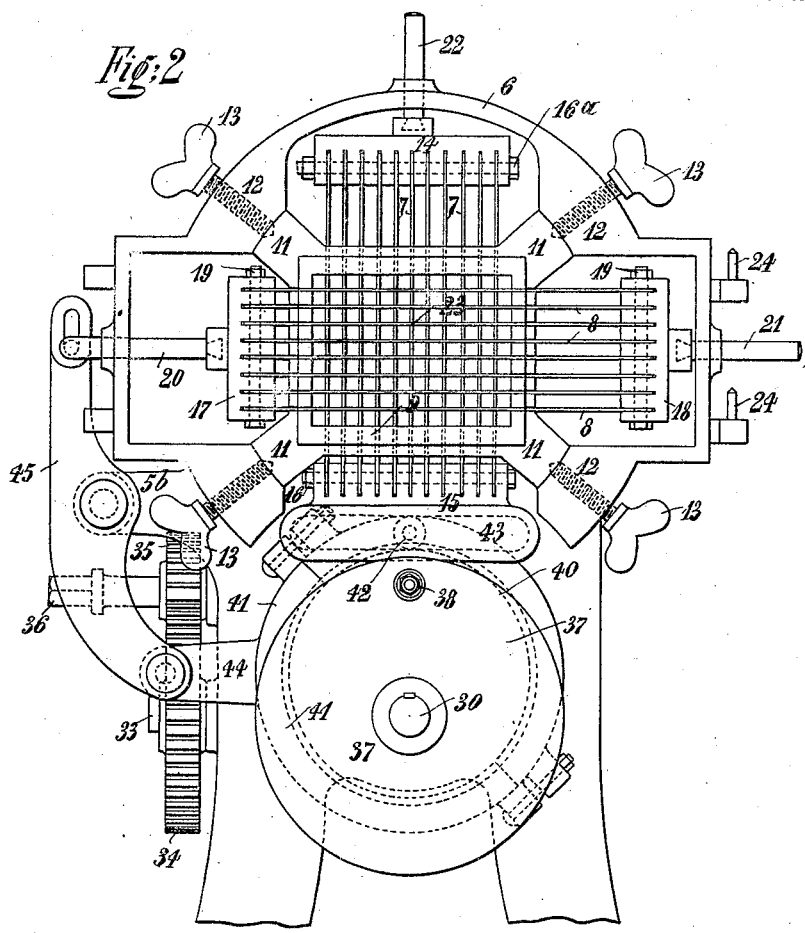
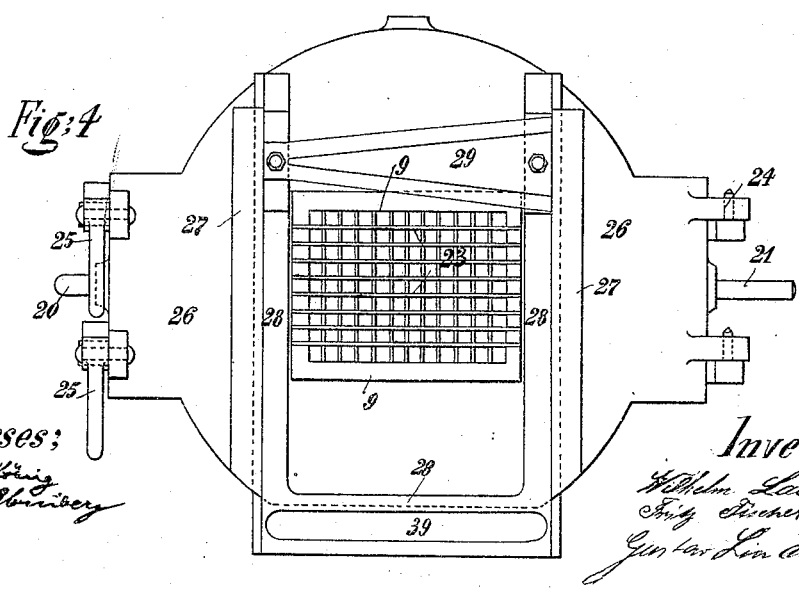

Patented July 21, 1903.

UNITED STATES PATENT OFFICE.

WILHELM LACOUR, FRITZ FISCHER, AND GUSTAV LINDENBERG, OF BARMEN, GERMANY.

MACHINE FOR CUTTING HAM.

SPECIFICATION forming part of Letters Patent No. 733,976, dated July 21, 1903.

Application filed November 24, 1902. Serial No. 132,610. (No model.)

*To all whom it may concern:*

Be it known that we, WILHELM LACOUR, FRITZ FISCHER, and GUSTAV LINDENBERG, citizens of the German Empire, residing at Barmen, in the Province of Rhenish Prussia, Kingdom of Prussia, Germany, have invented certain new and useful Improvements in Machines for Cutting Ham; and we do hereby declare the following to be a full, clear, and exact description of the invention, such as will enable others skilled in the art to which it appertains to make and use the same.

The present invention relates to improvements in machines for cutting ham, especially of that kind patented to Gustav Lindenberg, Fritz Altena, and Fritz Fischer, No. 682,722, on September 17, 1901; and it has for its object to simplify said machine, especially with regard to the cleaning and sharpening of the cutters or knives. We attain this object by constructing the knife-head as a piece for itself and by giving it such shape and arranging it so that it can be taken off from the machine, together with the knives, without requiring deranging or disconnecting any other parts or mechanisms of the machine. By this means any ordinary working man, not only an expert mechanic, can do the cleaning and sharpening of the knives and replace them and the whole knife-head in the machine. With this construction of the knife-head we have at the same time attained that the knives can be inclosed in a casing, in which they are protected from dust, and the danger of getting soiled is avoided.

On the accompanying drawings, Figure 1 shows the new machine in a vertical longitudinal section along line I I of Fig. 3. Fig. 2 is a front view seen from the right side of Fig. 1, the casing opened. Fig. 3 is partly a view in plan partly shown in a horizontal section along line II II of Fig. 1. Fig. 4 is a view seen from the right side of Fig. 1, but with the casing closed.

The trough 1 for taking up the ham to be cut forms a rectangular box, with a cover 4 held thereon on hinges 2 and locked by a latch 3. It is fixed on a table or standard 5, on which are also mounted the mechanisms for driving the machine. To the outlet side of the trough 1 is fixed a casing 6, in which are inclosed the vertically and horizontally moved knives 7 and 8, respectively. In this casing is placed the knife-head 9, cast in one piece and exactly fitting with its rear side to the rectangular trough 1 and to the casing, respectively. The knife-head has on its four side edges projections 11, fitting to corresponding cheeks 12 of the casing. The projections 11, facing the cheeks 12, as well as the respective surfaces of the cheeks, are turned, and they all lie in a circle the center of which goes through the geometrical axis of the knife-head. In consequence of this the knife-head can be put on between the cheeks 12 in any position and brought in its proper place by simply turning the same so that it fits exactly into the groove 10 of the casing. By set-screws 13 it can then be conveniently and securely held in position. In the rear side of the knife-head facing the trough 1 are arranged the knives 7, moving up and down. They are guided in slots in the upper and lower side of the knife-head 9, and outside of these they are held together by connecting-pieces 14 and 15, respectively, and by cross-bolts 16 16ª.

A little before the vertical knives are arranged the horizontally-moved knives 8, which pass through slots in the vertical sides of the knife-head 9, and outside of these they are held together by connecting-pieces 17 18 and by bolts 19. They thus form a compact and uniform system also. The connecting-pieces 17 18 of the latter system and also the connecting-piece 14 of the other system are provided with guide-bolts 20 21 22, respectively, which pass through the respective side wall of the casing 6 and are thus guided. By this a proper movement of the knives is attained and their clamping fast is prevented, while at the same time they can be easily taken asunder and detached from the knife-head.

In front of the horizontally-moved knives 8 there is arranged a grate made of plates 23, reaching by their rear edges to the back of the knives 8 and by their front edges to the mouth of the knife-head, thereby supporting the meat cut in prisms by the knives 7 and 8.

Both systems of knives are completely inclosed by the casing 6. At its front side the casing is provided with a door 26, held on hinges 24 and locked by keys or latches 25. A central opening is made into this door through which passes the mouth of the knife-head 9. When, however, the door is closed, it is impossible to take off the knife-head.

On the outside of the door there are guide-bars 27 for a frame 28, moving up and down therein. This frame carries a double cutting-knife 29, with oblique cutting edges. This knife is so arranged that it bears closely upon the face of grate 23 when moving up and down, so as to cut off neatly the prisms of meat projecting from the grate.

The cutting-tools described are set in motion by the shaft 30, carried in a bush-bearing 5ª of the table 5. Said shaft is turned by the shaft 33 by bevel-wheels 31 32, so that the latter one makes the double number of revolutions as the first one, and the shaft 33 is driven from the first-motion shaft 36 by means of the spur-gearing 34 35. The motion of the double cutting-knife 29 is imparted to it by a crank-disk 37 on the shaft 30, which by its pin and roller 38 reaches into a cross-slot 39 of the frame 28, so that this makes one stroke up and down at each revolution of the shaft 30. The movement of the knives 7 and 8 is caused by the eccentric 40 on shaft 30, a roller 42 being fixed to the strap 41 of said eccentric, and this roller reaches into a cross-slot 43 of the lower connecting-piece 15 of the knives 7, causing them thus to be moved up and down, while for moving the other set of knives 8 horizontally an arm 44, fixed to said eccentric-strap, is connected by one end to the double-armed lever 45, fulcrumed to a bracket 5ᵇ on the table 5, the other end of said lever being connected to the guide-bolt 20 of said system of knives 8.

The advancing of the ham in the trough 1 is caused by a piston 46, which is provided with cross-slots, so as to reach over the knives 7 and 8, as in the old machine, so that all the ham in the box can be fed to the front. By means of a rack 47 and pinion 48 the piston is moved forward, said pinion being keyed to the shaft 49, on which is keyed the ratchet-wheel 50 at the rear side of the box 1, and this shaft 49 receives an intermittent motion by the ratchet-gear 50 51. The pawl 51 of this gear is held movably on a connecting-rod 54, which is carried in guides 52 53, and by the weight of the handle 55 it is held in contact with the teeth of the ratchet-wheel. A spring 56 has the tendency to press the rod 54 and the roller 57 at its lower end against the eccentric 58 on shaft 33, which causes the connecting-rod to make one stroke at each revolution, and thus a partial turning of the shaft 49 and an intermitting advance of the piston 46. Now since the shaft 33 makes the double number of revolutions as the shaft 30, by which the knives are moved, the ham will be pushed forward once during each stroke of the knives, and this feeding motion is made and completed always when the knife 29 has reached the dead-points of its stroke. The second pawl 59, engaging with the ratchet-wheel 50, prevents the back motion of the same, and the set-screw 60 at the upper end of the rod 54, which bears upon the guide-piece 52, serves for regulating the amount of the turning of the ratchet-wheel.

As will be best seen from the drawings, in this machine the ham is first divided in vertical sheets, which are then cut into rectangular prisms by the knives 8. These prisms are then supported by the grate 23 and the double cutting-knife 29 then cuts off the cubical pieces.

When it is desired to take off the knife-head, all that is required to be done is to open the door 26 of the casing 6 and to undo the screws 13 and take out the bolts 16 and 19, when the knife-head 9, together with the knives 7 and 8, can be pulled out. The eccentric 40 and the crank-disk 37 are so shaped and so arranged that they do not hinder the placing in and out of the knife-head, as will be seen from Fig. 1. The connecting-pieces 14 15 and 17 18, respectively, having been detached, the knives 7 8 can be taken off for cleaning and sharpening purposes, and it will be seen that all these manipulations can be done by an ordinary workman without requiring the assistance of a mechanic.

We are aware that meat-cutting and ham-cutting machines have been invented and in use before our invention, and we therefore do not claim, broadly, such a machine; but What we do claim as our invention, and desire to secure by Letters Patent, is—

1. In a machine for cutting ham a frame or standard 5, a shaft 36 carried in said frame, a pinion 35 keyed to said shaft and engaging with a spur-wheel 34 on a shaft 33, a bevel-pinion on said shaft 33 gearing into a bevel-wheel 31, a shaft 30 carrying said bevel-wheel and held in a bush-bearing 5ª of said frame 5, in combination with an eccentric 40, an eccentric-strap 41 on said eccentric, a roller-pin 42 fixed to said strap and engaging with a slotted connecting-piece 15, a set of vertical knives 7 jointed at their lower end to said connecting-piece by a bolt 16, a connecting-piece 14 jointed to the knives 7 at their upper end by a similar bolt 16ª, a guide-bolt 22 at the side of said connecting-piece 14 and passing through the upper flange of the casing 6 thereby guiding the knives 7 vertically, an arm 44 projecting sidewise from said eccentric-strap, a double-armed lever 45 fulcrumed on a bracket 5ᵇ of said frame 5, said lever engaging with a guide-bolt 20 guided in the side wall of casing 6, a connecting-piece 17 fixed to said bolt 20, horizontal knives 8 held on said connecting-piece by a bolt 19, a connecting-piece 18 at the other end of said knives 8, a guide-bolt 21 passing through the corresponding flange of the casing 6 for guiding the knives 8 in their movement to and fro, the whole as described and illustrated and for the purpose set forth.

2. In a machine for cutting ham a frame or standard 5, a trough 1 carried by said frame, a cover 4 on said trough in combination with a piston 46 held movably in said trough, a rack 47 projecting from the rear side of the piston, a pinion 48 engaging with said rack, a shaft 49 carrying said pinion, a ratchet-wheel at the outer end of shaft 49, a bar 54 having a ratchet-pawl 51 linked to it so as to engage with said ratchet-wheel, brackets 52, 53 of the frame 5 carrying said bar 54, a roller 57 at the lower end of this bar, a spring 56 fixed with one end to the bar 54 and with the other end to the frame 5 so as to pull the bar downward and keep its roller 57 in contact with an eccentric 58 keyed to the inner end of shaft 33 for giving the bar 54 a to-and-fro movement in axial direction, a set-screw 60 at the upper end of said bar bearing against the upper side of the bracket 52 for adjusting the length of the stroke of the same, the whole as described and illustrated and for the purpose set forth.

In testimony whereof we have affixed our signatures in presence of two witnesses.

WILHELM LACOUR.
FRITZ FISCHER.
GUSTAV LINDENBERG.

Witnesses:
OTTO KÖNIG,
EMIL BLOMBERG.